Sept. 9, 1958 L. A. LEDGETT 2,851,097
APPARATUS FOR AND METHOD OF SEPARATING GAS FROM SOLIDS
Filed Nov. 10, 1950 4 Sheets-Sheet 1

INVENTOR
LOWELL A. LEDGETT
BY Trenton Meredith
ATTORNEY

Sept. 9, 1958  L. A. LEDGETT  2,851,097
APPARATUS FOR AND METHOD OF SEPARATING GAS FROM SOLIDS
Filed Nov. 10, 1950  4 Sheets-Sheet 2

INVENTOR
LOWELL A. LEDGETT
BY Trenton Meredith
ATTORNEY

Sept. 9, 1958 L. A. LEDGETT 2,851,097
APPARATUS FOR AND METHOD OF SEPARATING GAS FROM SOLIDS
Filed Nov. 10, 1950 4 Sheets-Sheet 3
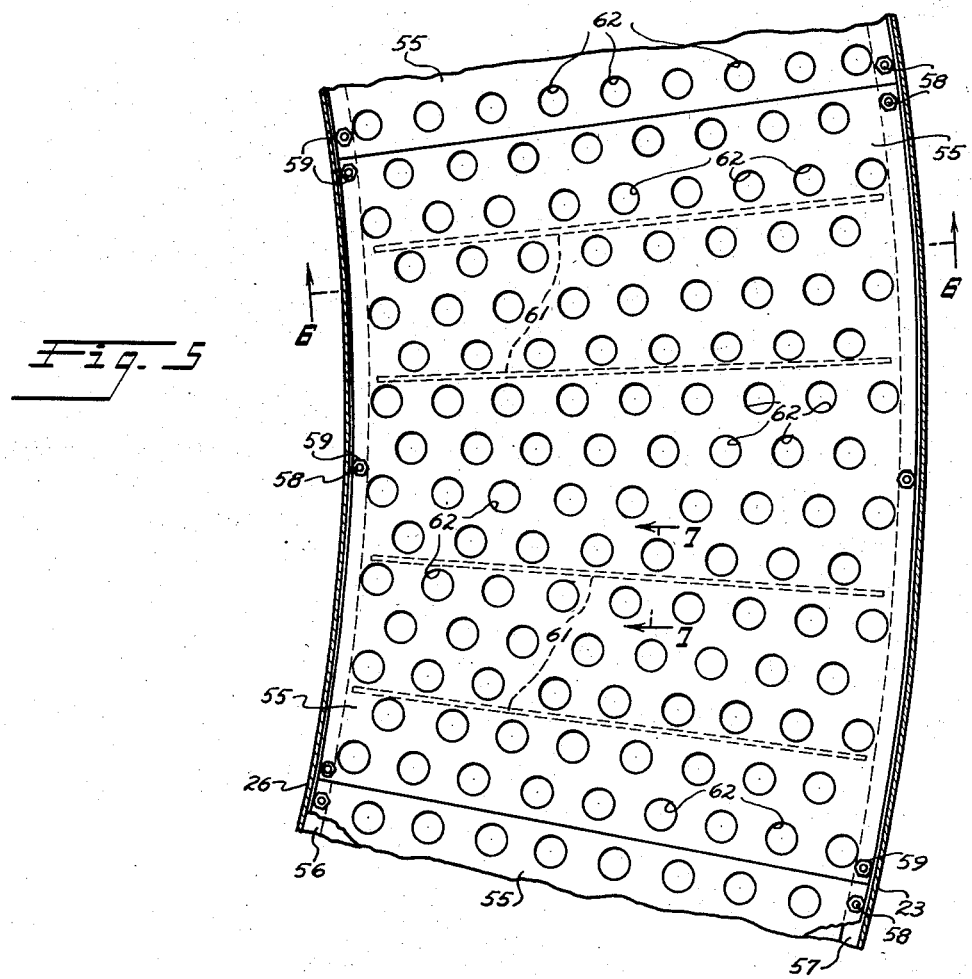
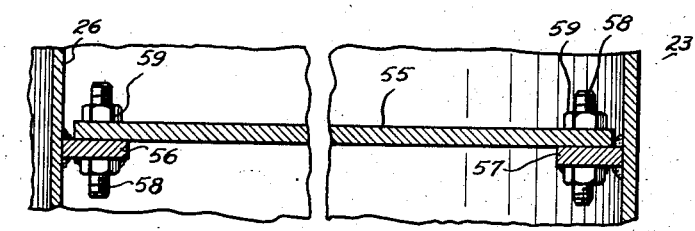
INVENTOR
LOWELL A. LEDGETT
BY Trenton Meredith
ATTORNEY

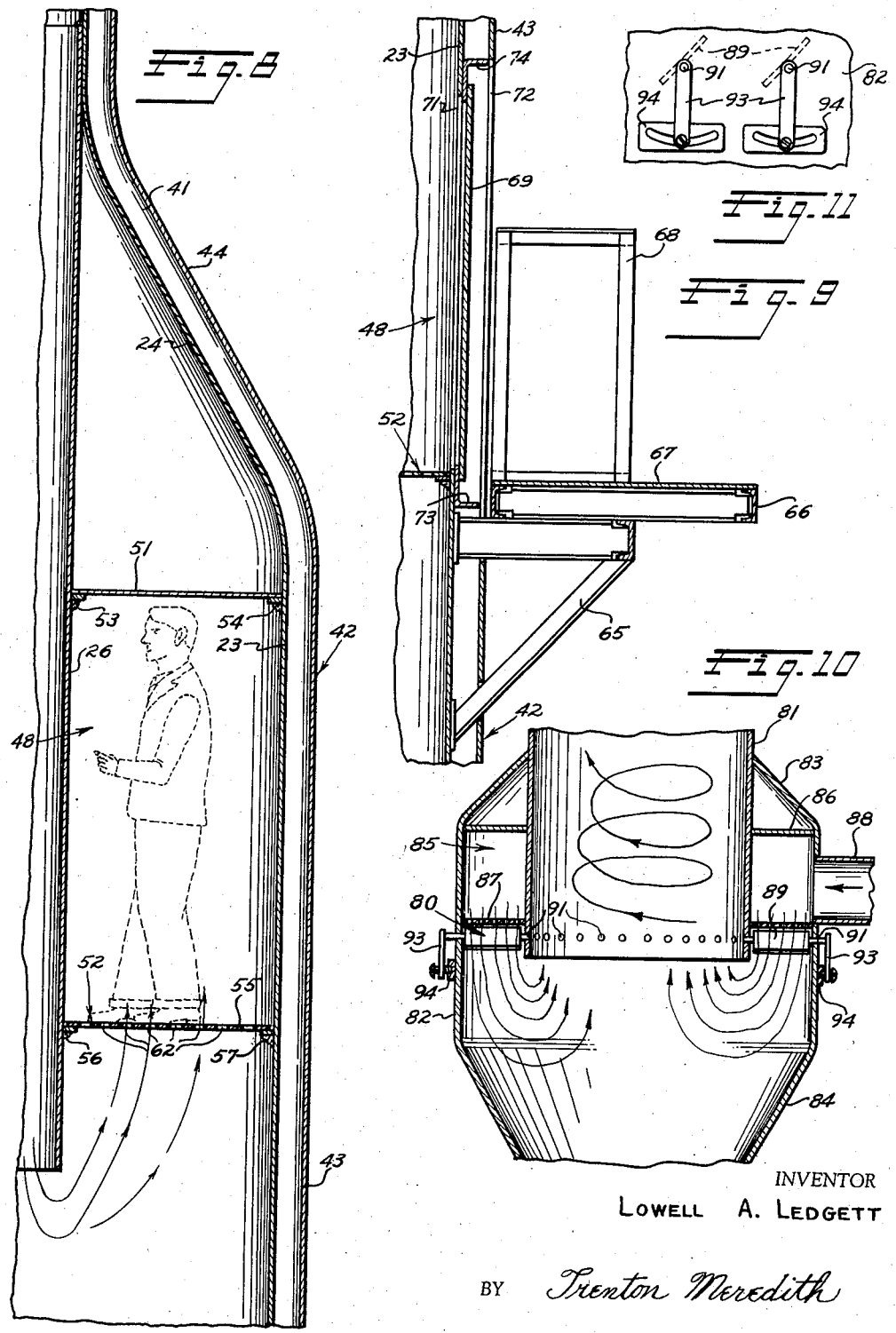

United States Patent Office 2,851,097
Patented Sept. 9, 1958

2,851,097

APPARATUS FOR AND METHOD OF SEPARATING GAS FROM SOLIDS

Lowell Ashton Ledgett, Ridgewood, N. J., assignor to Colgate-Palmolive Company, a corporation of Delaware Application November 10, 1950, Serial No. 194,991

14 Claims. (Cl. 159—4)

This invention relates to apparatus for and method of separating gas from solids. More particularly, the invention with respect to the apparatus relates to special plenum constructions which are useful in spray drying towers and equipment in which a carrier gas stream is separated from solid particles which have been suspended or carried therein.

In its preferred embodiment the invention will be described as applied to spray drying towers wherein the sprayed material to be dried, which may be a liquified soap, detergent or the like, travels concurrently with the stream of hot drying gas. It will be understood that the same principle is applicable to other equipment where separation of gas from solids is effected, such as air lifts and the like.

As will further appear this novel plenum structure has also special advantages in countercurrent spray drying towers.

The drying gas may be heated air but more advantageously comprises a gas consisting of the products of combustion of a furnace mixed with excess air, the mixture being controlled to provide a drying gas of the desired temperature and other special characteristics for the purpose. The term gas as used herein is intended to include all such practices.

An early concurrent type spray drying tower is disclosed in Uhl Patent No. 1,782,054, issued November 18, 1930. In that patent the dried product and the spent hot drying gas are continuously removed through a common passage at the bottom of the tower, and devices known as collectors are employed to separate the spent drying gas from the dried particulate material. Subsequently to Uhl it has been suggested to remove the spent drying gas directly from the lower portion of the tower, as by an annular ported plenum externally surrounding the tower and connected to a suitable gas handling system. The earlier towers provided with plenums of this type contained a conical skirt within the tower so disposed that the spent drying gas drawn out by the plenum passed down around the lower smaller diameter edge of the skirt and then upwardly between the skirt and tower wall to the plenum ports in the tower wall. This arrangement was reasonably workable but not entirely satisfactory under conditions wherein the quantity of hot gas passed through a typical twenty foot diameter tower was about 30,000 to 40,000 cubic feet per minute, but when the tower output and efficiency was stepped up to pass 60,000 cubic feet per minute and more through the tower it was observed that an undesirable amount, about thirty percent, of the useful product was being extracted along with the spent hot gas through the plenum. A primary cause of this was discovered to reside in the fact that the restriction of the tower cross section offered by the conical skirt produced an increased gas velocity at that region so that the spent gas carried with it and out through the plenum an excess of the useful product. It was also observed that the hot gas passing over the lower edge of the skirt in the prior construction passed through a curtain of concentrated falling particles of the product at that point of its highest velocity and thereby tended to pick up a maximum of the product. Attempts to remedy the condition as by regulating the amount of gas handled resulted in lowering this percentage of extraction of the useful product to about twenty percent but this was still highly unsatisfactory.

Also the skirt was in the direct path of the falling product and impingement of partially dried spray product on the skirt resulted in a build-up of an accumulation of the product on the skirt surface and in balling up of the product into undesirably large particles.

With the above disadvantages of the prior apparatus in view, it is an important object of my invention to provide a novel associated tower and plenum construction wherein undesirable restrictions and spray product impingement in the tower are eliminated and the spent hot gas is extracted at relatively low velocities with a smaller amount of useful product entrained in it than has been possible with the prior apparatus.

It is a further object of the invention to provide a spray drying tower having a novel gas conducting plenum so constructed and arranged as to provide substantially uniform peripheral distribution of gas passing through the tower wall, whether in concurrent or countercurrent towers, and to assure that there is no accumulation of dust in the plenum, thereby eliminating product contamination and reducing fire hazards.

It is another object of my invention to provide a special plenum construction for spray drying apparatus for maintaining pressures favorable to substantially uniform gas distribution and velocities of the gas sufficient to convey entrained dust during lateral flow through the plenum.

It is a further object of the invention to provide a novel gas conducting plenum in association with a spray drying tower wherein the bottom of the plenum is provided with a plurality of closely spaced apertures of such size and relative spacing as to leave a minimum of effective area for accumulation of dust.

It is a further object of the invention to provide a novel concurrent spray drying tower wherein spent drying gas leaves the tower in an annulus with low velocity to minimize dust entrainment and enters the perforated bottom of a plenum at sufficient pressure drop to assure substantially uniform peripheral distribution of the exhaust gas from the tower.

It is a further object of the invention to provide a novel concurrent spray drying tower wherein exhaust spent drying gas approaches the closely perforated bottom of a plenum at low velocity for carrying a minimum of dust, but passes through the plenum bottom at sufficiently high velocity to keep all entrained dust in suspension until it is carried out through the plenum outlet.

It is an important object of the invention to provide in a countercurrent spray drying tower a novel plenum structure providing low inlet velocity throughout an annulus and directional controls for blanketing the entire cross-section of the tower to obtain optimum gas-product mixing within the tower.

A further object of the invention is to provide a novel plenum structure in a countercurrent spray drying tower wherein hot drying gas uniformly leaves the closely perforated bottom of a plenum at high enough orifice velocity to prevent upstream migration of dust such as does occur in prior duct type plenum inlets.

It is a further object of the invention to provide a novel concurrent spray drying tower having no spray product impingement surfaces in the path of partially dried spray product.

A further object of the invention is to provide in a spray drying tower a novel associated tower and plenum construction wherein the spent drying gas is drawn out without traversing a region of falling particles of the product which is more dense than any other region.

It is a further object of the invention to provide in a spray drying tower a novel plenum wherein the spent hot gas is collected and wherein dust or other particulate matter in the withdrawn drying gas does not prematurely settle out and accumulate within the plenum. This maintains the plenum inlet ports open and avoids the accumulation of a dusty heat sensitive product which might be exposed to conditions that would deteriorate the dust for reuse in the process.

A further object of my invention is to provide in a spray drying tower apparatus a novel plenum having a symmetrically ported bottom inlet wall.

It is a further object of the invention to provide in a spray drying tower apparatus a novel plenum surrounding the tower and adapted to pass the spent drying gas therethrough with immaterial drop in pressure, thereby eliminating the need for special plenum inlet ducts and shapes hitherto considered necessary to maintain pressures favorable to uniform gas distribution and velocities of the gas sufficient to convey entrained dust during lateral flow through the plenum.

A further object of my invention is to provide a novel plenum having a ported inlet wall wherein the size of the ports is such that the pressure drop across each port is materially greater than the pressure drop during lateral flow of gas through the plenum.

Further objects of the invention will presently appear as the description proceeds in connection with the annexed specification and the accompanying drawings wherein:

Figure 5 is an enlarged plan view of a section of the ported bottom wall of the plenum;

Figure 6 is a section on line 6—6 of Figure 5;

Figure 7 is a section on line 7—7 of Figure 5;

Figure 8 is an enlarged fragmentary elevation in section illustrating further details of the tower and plenum structure;

Figure 9 is a fragmentary section illustrating a detail of the tower wall;

Figure 10 is a generally diagrammatic partially sectional side elevation of a further embodiment of the invention wherein the improved plenum is used in a countercurrent spray drying tower; and Figure 11 is a diagrammatic view illustrating the adjustable louvre arrangements.

Figures 1, 2:
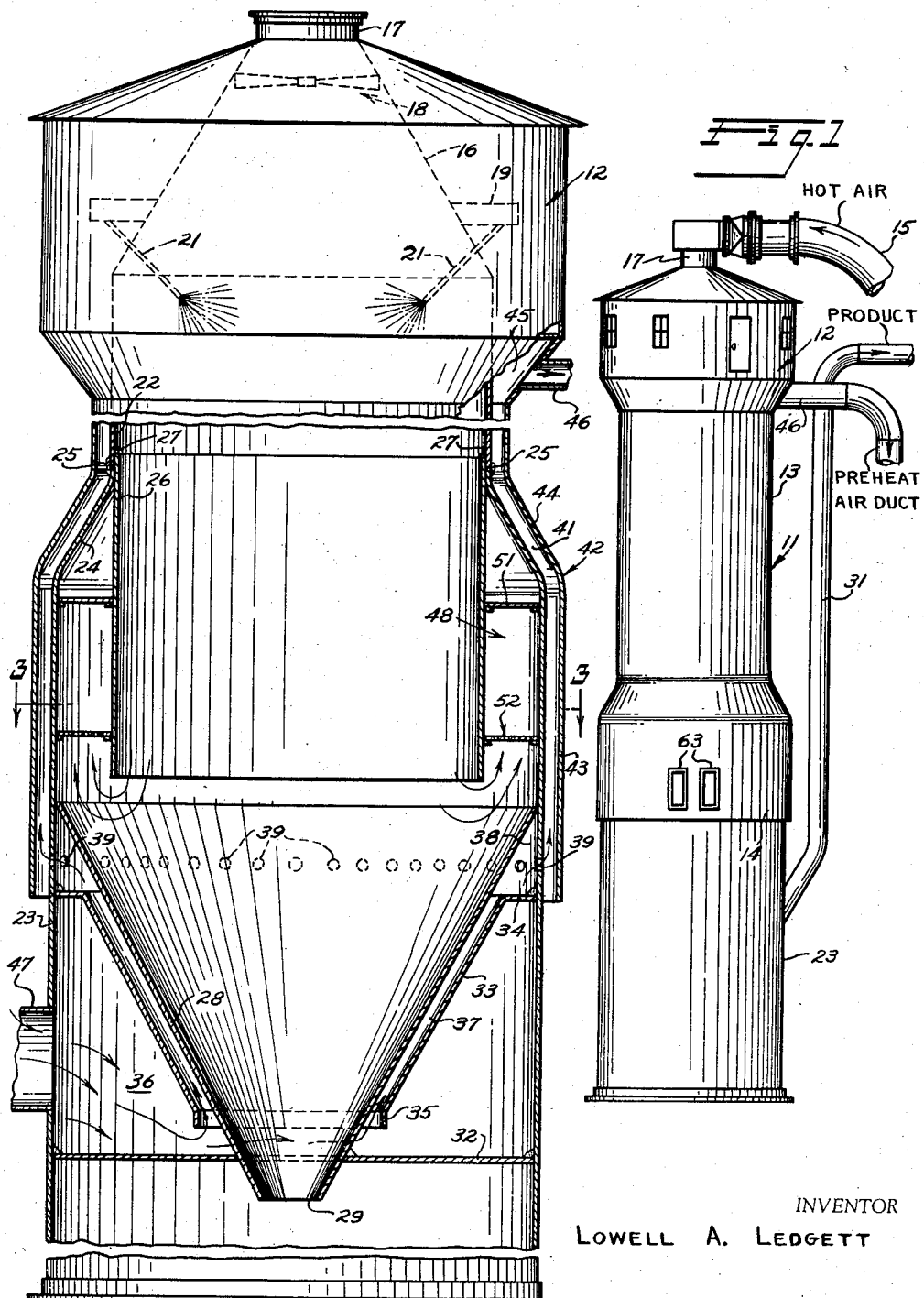
Figure 1 is an elevation of a spray drying tower according to a preferred embodiment of the invention.
Figure 2 is an enlarged elevation, partially broken away and partially in section, of a spray drying tower construction having a special tower wall and plenum construction according to a preferred embodiment of the invention.

Figure 1 illustrates a spray drying tower 11 for soaps and detergents comprising an upper head section 12 where the hot drying gas and the material to be dried are introduced, an intermediate section 13 wherein the drying gas and sprayed material flow concurrently, and a bottom section 14 where the spent hot gas is extracted through a plenum and the useful product is removed.

Referring to Figures 1 and 2, hot drying gas at a suitable temperature is introduced at the top of the tower through a conduit 15 connected to head 12. Internally head 12 supports a conical wall 16 which is connected to conduit 15 at its smaller upper end by a tube 17 so as to serve as a flared outlet for the conduit within the tower. A suitable gas inlet varying device 18 is mounted in wall 16 to control and distribute the incoming hot gas, and this device may be of any suitable type such as that disclosed in said Uhl patent.

A manifold 19 is also supported within head 12 suitably connected to a source of hot liquid soap or other material to be spray dried (not shown), and a series of nozzles 21 project through wall 16 for discharging sprays of the material into the tower. The hot liquid particles sprayed into the tower by nozzles 21 are entrained in the incoming hot gas stream and positively propelled down the tower section 13. During this intimate contact of the material and the hot gas, the major part of the water and other volatile content of the material is evaporated. It will be understood that any suitable manner of combining the gas and sprayed material may be used without departing from the spirit of the invention and reference is made to said Uhl patent for any more detail as to one available process.

The internal tower construction comprises a cylindrical member 22 that extends vertically down from the lower enlarged end of wall 16. As illustrated in Figure 2, a second cylindrical member 23 of larger diameter than member 22 and adapted to serve as the bottom wall of the tower is formed at its upper end with a gradually reduced inclined frusto-conical portion 24 of the same end diameter and butt welded at 25 to the lower end of member 22 so as to be substantially continuous with member 22. A short cylindrical member 26 is telescoped within the lower end of member 22 and welded thereto at 27 adjacent the butt welded joint, and member 26 is of such length as to extend down past the conical tower section 24 to define an annular space between parallel members 23 and 26 for the spent hot gas extracting plenum as will later be described. Since both members 22 and 26 are of sheet metal and are smoothly telescoped, this construction provides an internal tower wall of substantially the same diameter all the way from the upper end of member 22 to the lower end of member 26 and no restriction or other gas velocity increasing formation is disposed therein in the path of the hot drying gas and sprayed particle stream. There is also no surface in the tower disposed to be impinged by hot tacky spray product prior to removal of the drying gas.

Below member 26 is disposed an inverted frusto-conical funnel 28 having its upper end welded all about the interior of member 23 and having a lower restricted opening 29 through which passes the dried product for eventual delivery to a product removal conduit 31 illustrated in Figure 1. The lower end of funnel 28 is supported by an annular plate 32 welded to both it and member 23. As is illustrated in Figure 2, the upper end of funnel 28 is sufficiently below the lower end of the internal tower wall 26 to permit extraction of the spent hot drying gas by the plenum.

Funnel 28 is surrounded over an intermediate portion of its length by a larger spaced frusto-conical shell 33 that has at its upper end a flange 34 welded to member 23 and has at its lower end an open collar 35. Shell 33 defines with member 23 and plate 32 an annular space 36 which is open to the annular passage 37 between the funnel and shell that leads to an annular space 38 above flange 34. Adjacent space 38, member 23 is formed with a series of apertures 39 that open outwardly into an annular passage 41 between the exterior of members 22 and 23 and an outer shell 42 the lower edge of which is disposed at about the level of flange 34.

Shell 42 comprises a lower cylindrical section 43 and intermediate gradually reduced frusto-conical section 44 that are concentric with the member 23 and its reduced section 24, and its upper cylindrical section is concentric with member 22 so that passage 41 is continuous about and along the intermediate part of the tower and up to an internal annular manifold 45 within the tower head. Manifold 45 connects with an exhaust conduit 46.

Cool air is thus introduced into the lower end of the tower through a conduit 47 and flows up passages 37 and 41 into exhaust conduit 46. This cool air is heated by contact with the tower walls, thereby continuously cooling wall members 22 and 23 and funnel 28 to prevent the operating temperature of the tower wall from rising too high. Preferably the air exhausted in conduit 46 is supplied to the source of hot drying gas connected to conduit 15, whereby cooling of the tower serves to provide a supply of preheated air for the drying gas intake and increases the efficiency of the tower.

The novel plenum according to a preferred embodiment of the invention will be described. The plenum is an annular symmetrical manifold indicated at 48 and comprises parallel annular horizontal top and bottom walls 51 and 52 secured at their peripheries to members 26 and 23 in the plenum space above mentioned. Thus the plenum is of the same rectangular cross section all around the tower. As illustrated in both Figures 1 and 8, bottom wall 52 of the plenum is located a material distance above the lower edge of wall 26, this structure enabling the spent drying gas to leave the tower in an annulus with low velocity to minimize particle entrainment and to enter the perforated bottom wall of the plenum at sufficient pressure to assure uniform peripheral distribution of the exhaust gas from the tower in accord with the foregoing objects of invention.

Top wall 51 (Figures 1 and 8) is preferably an imperforate annular plate of sheet metal resting on internal ledges 53 and 54 welded to members 26 and 23 respectively. Plate 51 may be welded or bolted to the ledges as desired, and it is substantially gas tight with members 23 and 26.

Bottom wall 52 is preferably a perforated plate assembly preferably made up of about twenty contiguous plate sectors 55 resting on internal ledges 56 and 57 welded to members 26 and 23 respectively. As illustrated in Figures 5 and 6, each sector 55 is removably secured to ledges 56 and 57 by a plurality of studs 58 and nuts 59. A plurality of braces 61 are welded along the bottoms of plate sectors 55 to reinforce them against the weight of a man walking along wall 52 when repairing, cleaning or inspecting the plenum but they do not block any of the apertures or orifices 62 in the plates.

Figures 3, 4:
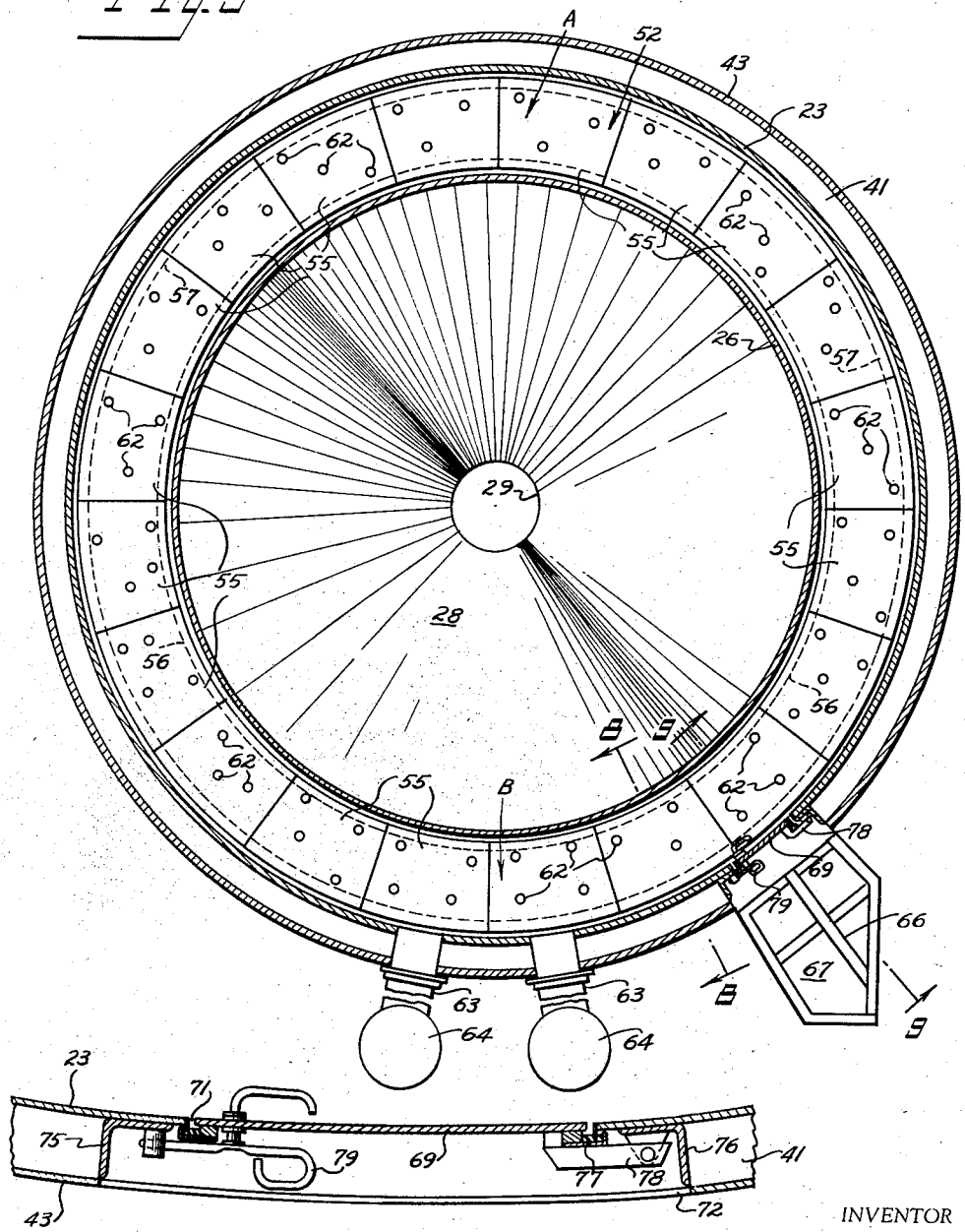
Figure 3 is a top plan view in section on line 3—3 of Figure 2, illustrating chiefly the plenum structure.
Figure 4 is an enlarged fragmentary plan view in section showing the details of the plenum door.

An extremely important phase of the invention lies in the fact that I provide a sufficient number of orifices 62 to pass the required volumes of spent drying gas and they are of such size that the pressure drop across each orifice is greater than the total pressure drop encountered during lateral flow of gas through the plenum into twin exhaust conduits 63 (Figure 3). In this arrangement I use a constant cross section plenum, preferably having a uniformly perforated bottom inlet wall, and I eliminate the use of special pressure controlling plenum shapes hitherto used to provide unform velocity during such lateral flow. The symmetrically perforated floor plate sectors are easily manufactured. While bottom wall 52 of the plenum is described as a perforated plate it may comprise any suitably apertured member, such as a grille and any other structure providing the necessary closely spaced apertures. Further, the lands between the apertures 62 need not be flat but may be of any suitable shape for minimizing deposit or accumulation of the dust.

Referring to Figure 3 the plenum region indicated at A is furthest from the plenum exhaust region indicated at B. The twin exhaust conduits 63 are connected to a suitable gas exhaust system. Considering the pressure drop along the plenum from region A to region B to be $\Delta P_1$, the size of orifices 62 is so chosen that the pressure drop across each ($\Delta P_2$) is materially greater than, preferably a multiple of, $\Delta P_1$. I have found that a satisfactory relation is where $\Delta P_2$ is at least five times as great as $\Delta P_1$.

In actual practice in a twenty foot internal diameter tower passing 60,000 cubic feet per minute of drying gas at 250° F., and having a plenum three feet wide and six feet high to enable a worker to enter and walk along wall 52, circular orifices 62 one and seven-eighths inches in diameter are formed in steel plates 55 that are one quarter of an inch thick. Each sector plate 55 contains 119 orifices 62.

By thus providing an arrangement wherein the gas enters the plenum at high velocity (2000 feet per minute) through a large number of closely spaced small holes, even though the horizontal exhaust velocity through the plenum is low with a minimum of zero at region A and a maximum of about 1665 feet per minute at region B, the gas is kept in such turbulence by entering through the apertures that a minimum of dust settles on the plates between orifices 62 and no bridging or plugging of orifices 62 is encountered.

The total pressure drop between regions A and B in the plenum was found to be about 0.05 inch of water for the above structure, and the pressure drop across each orifice 62 about 0.2 inch of water.

Exhaust conduits 63 are connected to dust collectors 64 where entrained product is removed and recovered for reuse in the process.

As illustrated in Figure 9, a supporting structure 65 is provided for an external platform 66 having a floor 67. The platform is surrounded by a guard rail 68 and provides the entrance to a door 69 in the side of the tower. Door 69 closes an opening 71 in cylindrical member 23 and is accessible through a larger opening 72 in shell 42. Door 69 is mounted in a frame comprising horizontal angles 73 and 74 (Figure 9) and vertical angles 75 and 76 (Figure 4).

As shown in Figure 4 the closed door is sealed air tight with the edges of opening 71 by a resilient strip 77 extending all about its periphery. The door is hinged at 78 and latched tight at 79, the latch handles being accessible both within and without.

Thus ready access is provided to the interior of the plenum so that a man may walk upright along 52. The orifices 62 are smaller than normal shoe heels and the plates are strong enough to bear a man's weight.

I have therefore devised a new and strikingly efficient spray drying tower wherein the sprayed product falls free of impingement with the tower wall during the drying phase and wherein objectionable increases in gas velocity and concentrations of the falling product are avoided. The surrounding plenum is of practical sturdy construction and so associated with the tower as to withdraw the spent drying gas uniformly around the periphery of the tower and exhaust it with a minimum of entrained product while leaving a minimum of deposited dust on the floor of the plenum, the latter avoiding a fire and explosion hazard. The plenum is constructed integrally with the tower walls being welded thereto so that it is supported or built into the tower, and no special support brackets are needed.

Figures 10 and 11 illustrate a further embodiment of the invention wherein the special plenum of the invention is incorporated in a countercurrent tower comprising a vertical cylindrical wall 81 defining a passage through which falls the sprayed material to be dried. The lower end of wall 81 is surrounded by the upper end of a cylindrical concentric tower wall 82 and joined to it by a welded conical web 83. The lower end of wall 82 reduces to a conical funnel section 84 below the lower end of wall 81.

The annular space between walls 81 and 82 contains a built-in plenum 85 whose side walls are portions of walls 81 and 82. The top wall 86 of the plenum is an annular plate extending between the walls like plate 51 of the other embodiment, and the bottom wall 87 of the plenum is an apertured plate like lower wall 52 of plenum 48. A suitable gas conducting connection 88 which here provides an inlet for hot drying gas is suitably connected to plenum 85.

Within the space between walls 81 and 82 and just below apertured wall 87, an adjustable annular louvre assembly generally indicated at 80 is mounted. This assembly comprises a plurality of individual vanes 89 mounted on shafts 91 for rocking about horizontal axes extending generally radially from wall 81, the opposite ends of shafts 91 being suitably journalled in the walls. Externally of wall 82, each shaft 91 has secured to it an arm 93 whose lower end is adjustable along a guide indicated at 94, so that each louvre vane may be individually adjusted. If desired all of the arms 93 may be connected for gang adjustment of the vanes.

In operation the incoming hot drying air is delivered by connection 88 to the plenum whose structure and characteristics are the same as plenum 48. This means that a peripherally uniform annulus of hot drying air will be discharged continuously downward from the plenum 85. The plenum structure, as above explained insures that the pressure drop across each orifice in wall 85 is much greater than the total pressure drop along the plenum between inlet connection 88 and the circumferentially furthest portion of the plenum, and the gas velocities are such that in association with the negligible effective area of apertured wall 87 within the plenum there is no tendency of the dust to migrate upstream and accumulate within the plenum.

The entering annulus of hot drying gas leaves the apertured bottom wall of the plenum 85 at sufficiently high orifice velocity to prevent upstream migration of the dust, such as occurs due to eddy currents in duct type plenums. In plenum 85 any accumulation of dust within the plenum would be negligible due to the downward passage of hot drying gas through the bottom which has closely spaced apertures over its entire area.

The entering annulus of hot drying gas is subjected to directional control at louvre assembly 80 for the purpose of spreading the hot gas to blanket the tower cross-section below the lower end of wall 81, a slight spin or swirl being imported as desired by adjustment of the louvres. This insures that the sprayed product falling down through the passage at 81 is thoroughly mixed with the hot drying gas as the latter first blankets the interior of the tower and then passes upwardly through the passage within wall 81 as in usual countercurrent tower operation.

My plenum functions reversely but similarly in the above described embodiments, but in both it accomplishes the same desirable ends, uniform peripheral gas distribution and elimination of dust accumulation in the interior of the plenum.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for separating gas from solids comprising a wall defining a passageway for gas and solid particles, means for withdrawing gas and separating out dust from the large solid particles surrounding said passageway adjacent the outlet end thereof comprising a plenum chamber having an apertured wall common with said passageway, a gas conduit communicating with said plenum chamber, said apertured wall forming the sole communication between said passageway and said plenum and consisting essentially of a rigid plate structure having a plurality of apertures of uniform size constructed and arranged for providing substantially uniform peripheral distribution of gas flow into and through said plenum, said apertures being such that entrained solids pass freely therethrough and the pressure drop across each aperture as the gas flows therethrough is materially greater than the maximum pressure drop in the gas during lateral flow through the plenum between said gas conduit and the aperture most remote therefrom, and means beyond the end of said passageway for receiving the larger solids separated from the gas.

2. An apparatus for separating gas from solids comprising means defining a generally vertical passageway for a downwardly flowing gas stream containing solid particles, said passageway being open at its lower end to discharge said stream, means surrounding said passageway adjacent said lower end forming a plenum chamber, a gas suction duct connected to said plenum chamber, an apertured bottom wall in said plenum chamber forming the sole communication between said passageway and said plenum chamber, said apertured wall being a rigid perforated plate structure spaced a substantial distance above the outlet end of said passageway and having a plurality of uniformly distributed apertures of uniform size substantially larger than the solid particles providing substantially uniform peripheral distribution and flow of the gas passing into said plenum chamber, said apertures being such that the pressure drop across each aperture as the gas flows into the plenum chamber is at least about four times as great as the maximum pressure drop in the gas during lateral flow through the plenum chamber to said suction duct, and means below said passageway for receiving the solids separated from said gas.

3. A method of separating gas from powdered solids comprising the steps of flowing a stream of gas laden with solids through and from a passageway toward a solids receiver, removing gas from said solids by flowing it outwardly and reversely with respect to the flow of said stream without increasing its velocity adjacent the end of the passageway whereby entrainment of solids in the reversely flowing gas is minimized, increasing the velocity of the reversely flowing gas a substantial distance from said passageway end by flowing the same and any entrained solids through apertures which are larger than the solids into a plenum, and flowing the gas after passing through said apertures laterally through said plenum to a gas outlet duct, the pressure drop through each aperture being at least about four times as great as the maximum pressure drop in said plenum whereby substantially uniform peripheral distribution of said gas flowing into the plenum is attained.

4. In a spray drying tower, means defining a generally vertically disposed passage for sprayed material to be dried, a gas conducting plenum substantially surrounding said passage adjacent and above the lower end thereof, and a gas conduit communicating with said plenum, said plenum having a side wall common with a part of the side wall of said passage defining means, a closed top wall extending outwardly from said common side wall and a stationary bottom wall consisting of a rigid perforated plate structure extending outwardly from said common side wall from a point above the lower edge of said passage side wall, said plate structure being provided with a plurality of substantially uniformly spaced and properly sized apertures substantially larger than the dried particles of sprayed material to produce substantially uniform peripheral distribution of gas flow between the plenum and the lower end of said passage, the size and arrangement of said apertures being such that the gas pressure drop across each of said apertures is at least about four times as great as the total pressure drop in the gas during its flow through the plenum between the gas conduit and the most distant aperture therefrom.

5. In a concurrent spray drying tower having means at the top of the tower for introducing hot gas and sprayed material to be dried, means providing an internal vertical substantially uniform cross-section tubular passage for free fall of said drying gas and sprayed material during which said material is dried to the desired solid particle product formed by said gas, said passage terminating short of the bottom of the tower, means spaced from the bottom of the passage for receiving the dried spray products, and a plenum in the side of the tower above the lower end of said tubular passage means having an apertured bottom through which spent drying gas emerging from the bottom of said passage is withdrawn, said plenum having an external exhaust conduit and said apertured bottom consisting of a substantially uniformly perforated plate structure having spaced apertures of substantially uniform size sufficiently large that solid particles entrained in the gas pass freely therethrough yet sufficiently small that the pressure drop across each aperture is at least about four times as great as the maximum pressure drop in the gas during lateral flow through the plenum to said exhaust conduit.

6. In a concurrent spray drying tower having means at its upper end for introducing hot gas and sprayed material to be dried, an internal tubular wall providing a vertical tower passage of substantially the same cross-section throughout its height and through which descend said gas and sprayed material during the drying operation, said wall terminating short of the bottom of the tower, means spaced below the lower end of said wall for receiving the solid spray dried particles, a plenum built into said tower and disposed about said wall above its lower end, said plenum having an apertured bottom portion located a substantial distance above the lower end of said wall through which spent hot gas is withdrawn after emerging from the lower end of said passage, and an external exhaust conduit connected to said plenum, said plenum bottom portion consisting essentially of a transverse rigid plate structure that is provided with substantially uniformly spaced and sized apertures, and said apertures being of such size as to permit entrained solid particles to pass freely therethrough and to provide thereacross a gas pressure drop that is at least about four times the maximum pressure drop in the gas during lateral flow within the plenum from any said aperture to said exhaust conduit.

7. In a spray drying tower having an internal tubular wall defining a vertical drying passage of constant cross-sectional area for free fall of dried solid particles, a tubular lower wall of larger diameter than said internal wall, said walls having adjacent ends overlapped so as to provide a substantially annular space therebetween, means joining the lower wall to said inner wall above said space, a gas conducting plenum having a closed top wall below said joining means and an apertured rigid bottom wall disposed in said space about said internal tubular wall materially above the lower edge of said internal tubular wall and a gas conduit communicating with said plenum, said bottom wall consisting essentially of a perforated plate structure having a plurality of substantially uniform spaced holes substantially larger than the solid particles of sprayed material and of such size that the gas pressure drop thereacross is at least about four times as great as the maximum gas pressure drop during lateral flow within the plenum between the gas conduit and the most distant of said holes therefrom.

8. In a spray drying tower, an upright tubular internal wall terminating short of the base of said tower, a tubular lower wall having a portion surrounding the lower end of said internal wall so as to provide an annular space therebetween, means securing said walls together above said space, a product directing funnel secured to said lower wall below the lower end of said internal wall for receiving the spray dried solid particles, an annular gas conducting plenum in said space, and a gas conduit communicating with said plenum, said plenum having as its bottom wall a uniformly apertured stationary plate structure extending transversely of said space substantially above the lower edge of said internal wall with the apertures therein substantially larger than the particles of sprayed material and of such size as to provide a gas pressure drop thereacross that is at least about four times the maximum pressure drop encountered during lateral flow of gas through the plenum between said gas conduit and the most distant aperture therefrom.

9. In a spray drying tower wherein liquid material is spray dried to the form of solid particles during passage therethrough, a gas conducting plenum comprising an annular duct of substantially uniform cross-section having as a bottom wall a stationary plate structure provided with a plurality of closely spaced apertures, and a gas conducting connection to said duct adapted to be connected to means for inducing lateral flow of gas through said duct, said apertures being substantially larger than the particles of sprayed material and of such size that the pressure drop across each aperture is at least about four times as great as the maximum pressure drop during lateral flow of said gas through the duct between the said connection and the most distant aperture therefrom.

10. In a spray drying tower having overlapped inner and outer walls providing an annular space therebetween, said inner wall defining a vertical spray drying passage of uniform cross sectional area terminating short of the bottom of the tower and permitting free fall of spray dried solid particles, transverse upper and lower annular members within said space extending between said walls and forming with said walls a gas conducting plenum of uniform cross-sectional area, and a gas conduit communicating with said plenum, said lower member consisting essentially of a stationary perforated plate structure having a plurality of substantially uniformly spaced apertures of substantially the same size, each aperture being substantially larger than the particles of sprayed material, and said apertures being so constructed and arranged that the gas pressure drop across each is at least about four times as great as the maximum gas pressure drop during lateral flow within the plenum between the gas conduit and the most distant aperture therefrom.

11. In a spray drying tower having upright vertical walls, means supported within the tower defining a vertically elongated tubular drying chamber which is substantially without restriction from top to bottom, means for spraying material to be dried into the upper end of said chamber for free fall therethrough, means for passing drying gas through said passage in contact with said falling material to produce solid spray dried particles including an annular duct built into the tower walls rigid with and surrounding the lower end of said chamber, and a gas conduit coupled to said duct at one side, said duct being in fluid communication with said chamber only through a wall of said duct that comprises a plurality of stationary plates each provided with a multiplicity of apertures that are substantially larger than the particles of sprayed material so as not to impede free passage of said particles or particle dust therethrough and that are substantially uniformly spaced and of such size that the gas pressure drop across each said aperture is at least about four times as great as the maximum pressure drop of the gas passing through the duct between said gas conduit and the most remote of said apertures.

12. In a spray drying tower, a tubular upright passage internally thereof, means for spraying material to be dried into the top of said passage, means below the bottom of the passage for collecting the solid spray dried product particles, an annular duct in the tower walls surrounding the lower end of said passage, said duct being in communication with said tubular passage only through a plurality of uniformly apertured stationary plates adjacent the lower end of said passage, and means for introducing hot drying gas into said duct at one side of the tower, the apertures in said plates being substantially larger than the particles of sprayed material and of such size that the pressure drop of the gas passing therethrough is at least about four times as great as the pressure drop in said duct between said point of introduction and the most distant aperture.

13. In a spray drying tower, an upright tubular treating chamber for providing free fall of solid spray material particles, a drying gas and particle dust withdrawal duct of constant cross-section surrounding the lower end of said chamber comprising coextensive gas impermeable side walls, an annular gas impermeable top wall, and an annular bottom wall, said bottom wall consisting essentially of a rigid plate structure formed with a plurality of uniformly spaced and sized apertures substantially larger than the particles of sprayed material so as not to impede free passage of said particles or particle dust therethrough, and a suction conduit connected to one side of said duct, the area of each aperture in said wall being such that the gas pressure drop across each aperture is at least about four times as great as the maximum pressure drop encountered in flow of said gas within said duct between said suction conduit and the most distant aperture therefrom whereby accumulation of particle dust in said duct is prevented.

14. In a spray drying tower, means defining an unrestricted generally vertical passage for sprayed material to be dried, said passage terminating in an open end short of the bottom of the tower, means for spraying said material into the upper end of said passage for free fall therethrough, and means for passing drying gas through said passage in contact with said material to produce falling solid spray dried particles comprising a plenum disposed about said passage adjacent the lower end of said passage, said plenum having gas impermeable side and top walls and having a bottom wall comprising a stationary rigid plate structure located materially above the lower end of said passage and formed with a plurality of apertures of uniform size and distribution substantially larger than the particles of sprayed material, said apertures providing the sole communication between said passage and said plenum and providing substantially uniform peripheral distribution and flow of gas passing between said passage and said plenum, and means including a gas conduit connected to said plenum at one side of the tower for inducing lateral flow of said drying gas therethrough, said apertures being such that the pressure drop across each aperture as the drying gas flows therethrough is at least about four times as great as the maximum pressure drop in the drying gas during said lateral flow through the plenum between said gas conduit and the aperture most remote therefrom whereby accumulation of particles or particle dust within said duct is prevented.

References Cited in the file of this patent

UNITED STATES PATENTS

| 556,282 | Schlecht | Mar. 10, 1896 |
| 631,990 | Huff | Aug. 29, 1899 |
| 706,796 | Burger et al. | Aug. 12, 1902 |
| 915,303 | Mecredy et al. | Mar. 16, 1909 |
| 1,090,740 | MacLachlon | Mar. 17, 1914 |
| 1,430,403 | Plummer | Sept. 26, 1922 |
| 1,450,840 | Dick | Apr. 3, 1923 |
| 1,952,308 | Bowen | Mar. 27, 1934 |
| 1,983,434 | Black et al. | Dec. 4, 1934 |
| 2,043,378 | Igarashi | June 9, 1936 |
| 2,222,396 | Bowen | Nov. 19, 1940 |
| 2,228,602 | Kolb | Jan. 14, 1941 |
| 2,355,963 | Ennor | Aug. 15, 1944 |
| 2,559,989 | Nyrop | July 10, 1951 |
| 2,619,942 | Rydberg | Dec. 2, 1952 |

FOREIGN PATENTS

| 889,439 | France | Jan. 10, 1944 |